United States Patent Office 3,509,335
Patented Apr. 28, 1970

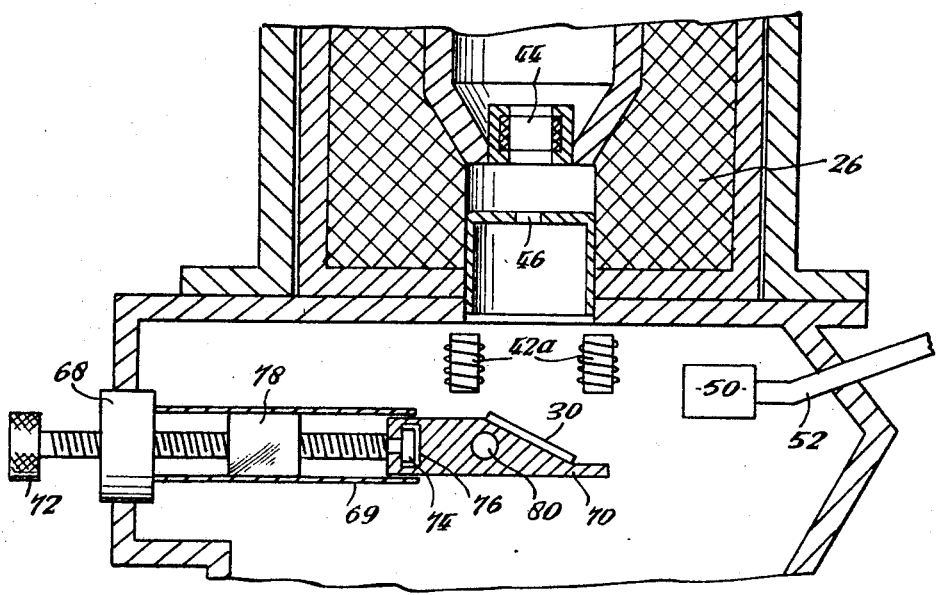
Fig. 2.
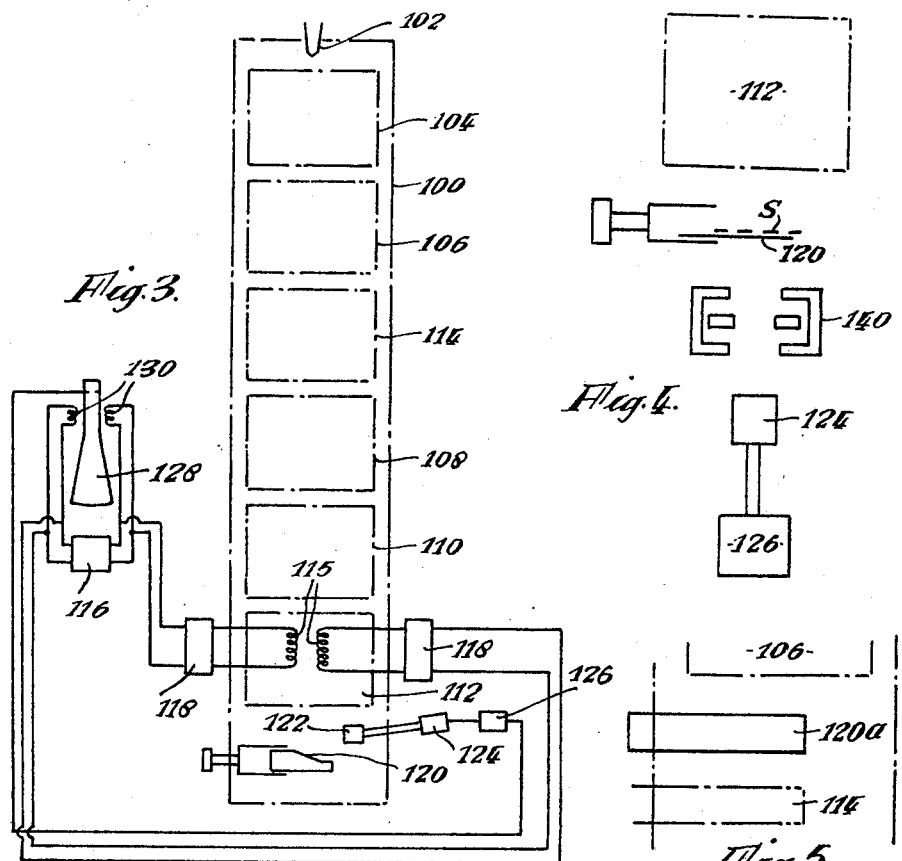
Fig. 3.
Fig. 4.
Fig. 5.

3,509,335
ELECTRON MICROSCOPE HAVING TWO SEPARATE SPECIMEN STAGES
William Charles Nixon, 2 Causewayside, Fen Causeway, Cambridge, England
Filed June 26, 1967, Ser. No. 648,736
Int. Cl. H01j 37/26
U.S. Cl. 250—49.5      10 Claims

ABSTRACT OF THE DISCLOSURE

The specification discloses the construction of an electron microscope that has two separate specimen stages so arranged that the electron beam areas at the respective stages are widely disparate, the stage associated with the larger beam area thereby being utilizable for non-scanning observations and the stage associated with the smaller beam area being utilizable for scanning observations.

---

Figure 1:
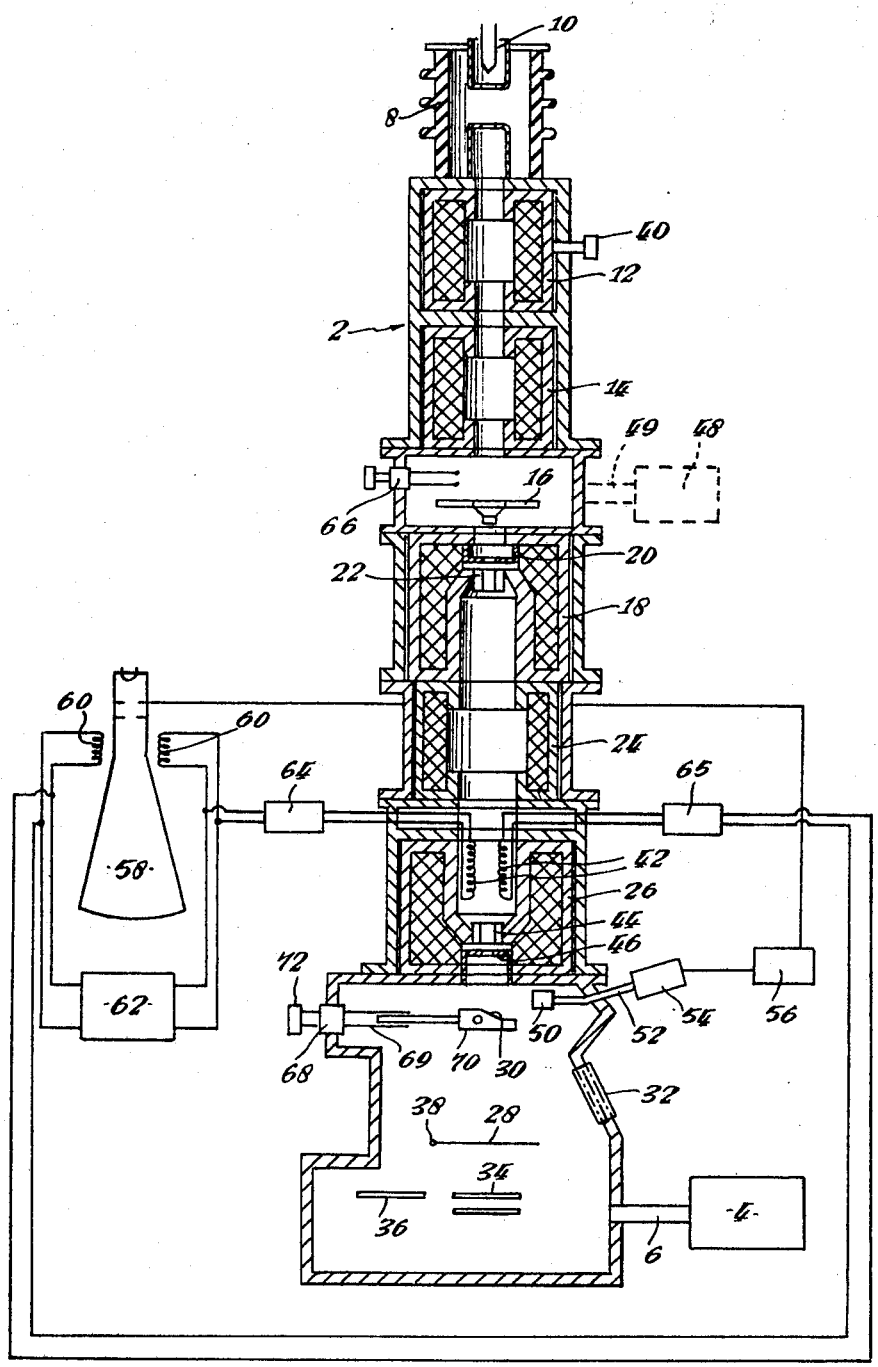

Electron microscopes at present fall broadly into two types in the first of which an electron beam travelling along a fixed axis is transmitted through a specimen under observation and the resulting modulation of the beam is recorded, while in the second type, the beam is oscillated to scan a given area and the characteristics of the area under observation indicated either by recording the transmitted beam energies from the scanned area or by the measurement of a further characteristic emission excited by the incident beam.

In the operation of these two techniques, a fundamental difference lies in the diameter of the beam that is required to impinge upon the specimen. In non-scanning techniques the beam area needed is considerably greater than can be employed for scanning techniques and consequently it has been necessary to construct different instruments in dependence upon the technique to be employed. Since electron microscopes are very costly items of equipment, this is clearly a disadvantage.

An object of the present invention is the construction of an electron microscope of such form that the same instrument can be employed both for scanning and non-scanning observations with a considerable resultant saving in cost to the user.

The present invention relies upon the phenomenon that the electron beam travels through the successive elements of the lens means of a non-scanning electron microscope so the beam area at the back focal plane of each lens element is reduced. It has been found that this reduction can be sufficient to provide an electron beam of a suitable area for scanning observations and accordingly, the invention provides in an electron microscope having a non-scanning specimen stage, a second specimen stage at the back focal plane of one lens element of the microscope lens means, beam deflection means being arranged preceding said second stage to actuate scanning movement of the beam over a predetermined area of the second stage. Depending upon the balance of requirements between beam definition and current intensity the scanning stage may be inserted at an earlier or later position in the series available, since an earlier position improves current intensity while a later position similarly favours beam definition.

In a further feature of the present invention, there is provided means for inclusion in a non-scanning electron microscope of such a second specimen stage and scanning means, it thereby being possible to adapt an existing microscope at relatively little cost to operate in both modes.

Embodiments of the invention will now be described with reference to the accompanying diagrammatic drawings, wherein:

FIG. 1 shows in section an electron microscope according to the invention having means for both scanning and non-scanning observation of specimens.

FIG. 2 is an enlarged view of the microscope of FIG. 1 in the region of the scanning specimen stage but with an alternative scanning coil arrangement, FIG. 3 indicates schematically the adaptation of a non-scanning electron microscope to permit additionally scanning observations in accordance with the invention, FIG. 4 is a schematic illustration of an adaptation of the microscope of FIGS. 1 and 2 to permit the examination of thin specimens by transmission techniques, and FIG. 5 illustrates schematically an alternative scanning stage position.

Referring more particularly to FIGS. 1 and 2 of the drawings, the microscope comprises a vacuum-tight outer casing 2 constructed in a series or axially abutting sections. A vacuum pump 4 is connected at a series of spaced points to the casing interior along its length by a manifold in known manner to maintain the vacuum therein during operation. The drawing illustrates only one conduit 6 of the manifold for the sake of simplicity.

At the upper end of the casing, a hollow insulator body 8 carries an electron gun 10. The emission from the gun is directed along the central axis of the casing. The focussing system for the electron beam comprises a series of electron lenses, these including first and second condenser lenses 12, 14 preceding specimen stage 16 where the beam is focussed on a relatively large area to provide for non-scanning observation of a specimen on the stage 16 which is itself vertically displaceable in conventional manner.

Immediately following the stage 16 is an objective lens 18 within the core of which are arranged an adjustable position aperture stop 20 and a stigmator 22 to correct aberations of the lens 18. An intermediate lens 24 follows the lens 18 and after this is arranged the final projector lens 26 which focusses the transmission image from the stage 16 onto a fluorescent screen 28, a second or scanning specimen stage 30 being retracted from the path of the electron beam when this mode of operation is to be employed.

The illumination pattern excited by the electrom beam on the fluorescent screen can be observed through a window 32 in the casing. Immediately below the fluorescent screen 28 is a mounting 34 on which photographic plates 36 can be set, the mounting lying in the image plane of the projector lens and the screen 28 being displaceable on a pivot 38 to permit the electron beam to fall directly upon a photographic plate on the mounting 34 and so record a magnified image of the beam as modulated by transmission through the specimen at the stage 16.

The operation of the instrument in non-scanning transmission observations as thus described is entirely conventional. As is well known in existing instruments, each electron lens, which comprises an annular winding within an enveloping pole member, seats within the casing with some radial clearance and adjusting screws, only one of which is indicated at 40, serve to control the positions of each lens relative to the axis of the electron beam.

The inclusion of means for scanning observations relies upon the fact that, as the electron beam passes through the successive lenses, the progressive magnification of its image results in the beam having progressively smaller focal areas at the back focal plane of each lens. After passing through the projector lens 26, the focal area at the back focal plane of that lens is a minimum for the whole system and is very considerably less than the beam focal area at the stage 16. The illustrated instrument therefore takes advantage of the phenomenon by providing the second specimen stage 30 at the back focal plane and arranging scanning coils 42 in the path of the electron beam preceding that stage to cause the beam to scan a predetermined area in the plane of the stage. Although only two coils 42 are illustrated, it will be appreciated that two pairs of coils will in fact be provided at right angles to each other to provide mutually perpendicular scanning displacements parallel to the $x$ and $y$ axes of the scan. Since in this manner of operation the characteristics of the projection lens are critical there are preferably also provided at the lens a stigmator 44 and an adjustable position aperture stop 46.

In a further feature of the present invention, the aperture stop 46 also performs a secondary function as a pumping hole to separate an ultra-high vacuum condition in the column above the stop, as required for field emission, from a normal high vacuum condition in the recording area below the stop. For this to be done, a second vacuum pumping system 48 has its manifold connected to the column above the stop, as indicated by the single conduit 49, while the pump 4 draws gas from the region below the stop only.

In the arrangement shown in FIGS. 1 and 2, the secondary electron emission from a specimen on the stage 30 is employed in a scanning observation, a collector 50 in the form of a scintillator being provided adjacent to and offset from the stage to receive the emission and to transmit it as light energy through a light pipe 52 to a photomultiplier 54, the resultant electrical signal passing to an amplifier 56 and then to the control grid of a cathode ray display tube 58.

Scanning coils 60 of the tube 58 produce $x$ and $y$ scanning deflections of the tube beam under the control of oscillator means 62 forming the time bases of the tube. It will be noted that the oscillator means 62 likewise feed the scanning coils 42 of the microscope so that both scanning movements are kept in synchronism. In order to control the magnification of the observed image respective magnification control means 64, 65 are provided for the $x$ and $y$ scanning coils of the microscope.

At both specimen stages 16, 30, respective air locks 66, 68 are provided to permit the insertion and withdrawal of specimens. As FIG. 2 shows in more detail, means are further provided at these stages for adjusting the specimen position in the plane of the stage. Thus, carrier means 69 fixed to the instrument casing supports stage block 70 and adjustment screw 72 projecting to the exterior of the casing 2 comprises a terminal button 74 that seats in a slot 76 of the block 70. The screw is threaded to a captive nut 78 so that rotation of the screw displaces the block 70 axially of the screw. A similar button and slot engagement is provided at 80 to permit displacements of the block 70 at right angles to the screw 72, the button 74 then sliding along the slot 76. It is also possible to provide a vertically displaceable stage at 68 as at 16, this allowing some latitude in the location of both airlocks 66, 68.

FIG. 2 also shows the microscope scanning coils, here indicated at 42a, occupying an alterative position. It will be appreciated that in either case the coils can be replaced in known manner by electrostatic deflection plates.

FIG. 3 illustrates the manner in which an existing non-scanning electron microscope can be adapted according to the invention to provide for scanning observations. The existing instrument as indicated in outline by chain-dotted lines comprises a gas-tight casing 100 with electron gun 102, objective lens 108, intermediate lens 110 and projector lens 112, the non-scanning specimen stage being interposed between the lenses 106 and 108.

To this arrangement there is added, within the casing, mutually perpendicular pairs of scanning coils 115 (only two individual coils are shown) actuated by time base means 116 through separate amplification control means 118. A speciment stage 120 is located in the back focal plane of the projector lens 112 and an electron collector 122 receives electron emissions from a specimen at that stage, these being transmitted, in the manner described with reference to FIGS. 1 and 2, through a photomultiplier 124 and amplifier 126 to the control grid of a cathode ray display 128, the scanning coils 130 of which are actuated also by the time base means 116. Thus, by virtue of this additional structure the microscope is to be used for scanning observations.

FIG. 4 shows schematically a modification of the lower end of the apparatus in which the scanning of the specimen is used in a transmission technique. In this case, the electron beam, after passing through the projector lens 112, is transmitted through a thin specimen S at the stage 120. The analysis of the resulting modulation of the electron beams performed by placing a velocity filter 140 in the path of the beam, the scintillator 124 now being located downstream of the filter 140 to receive electrons passing the filter and the display being presented on a cathode ray tube as described above.

The scanning observation means of the present invention can be adapted to operate under the actuation of other forms of emission from the specimen than those already referred to. In particular, techniques using primary electron emissions or the radiation of light, infrared, ultra-violet or X-ray wavelengths from the specimen can be used. Since these are techniques that are themselves well known in the art, further exemplification is unnecessary, however.

Although the preceding description shows the second specimen stage to be at the back focal plane of the final projector lens of each instrument illustrated, since this offers the smallest possible scanning electron beam area, it will be appreciated without further illustration that the stage can be disposed at the back focal plane of an earlier lens of the beam focussing system and this has the advantage of improving the current density of the beam.

In particular, high definition can be compromised if current density is a ruling criterion, as in X-ray analysis, when by placing the second stage earlier in the focussing system the required balance between definition and current density may be achieved.

In the adaptation of an existing non-scanning instrument there is a practical advantage in placing the second specimen stage either at the position illustrated in FIG. 3 or adjacent to the first specimen stage depending upon whether definition or current density is important, since at both these locations there are chambers of some volume already present in which the additional elements can be more easily located. Thus, FIG. 5 shows second stage 120a placed upstream of the first stage 114 and in the same chamber, it now being located in the back focal plane of the second condenser lens 106.

What I claim and desire to secure by Letters Patent is.

1. An electron microscope comprising, in combination, an electron source, electron condenser lens means in the path from said source, first stage means for locating a specimen in said electron path downstream of the condenser lens means, electron magnification lens means in the path from said first stage means specimen location, second stage means for locating a specimen in the electron path and at a back focal plane of one lens element of the microscope lens means, first electron image recording means being located in the electron path downstream of said magnification lens means, said first image recording means providing an electron image of a specimen at said first stage means for subjecting said specimen to a non-scanning electron beam, electron beam scanning means being provided in the electron path upstream of said second stage means and said second recording means being arranged to receive a preselected electron emission from a specimen at said second stage means, a visual recording arrangement being connected to said recording means to receive a signal therefrom in dependence upon said received emission, scanning signal means being connected to said arrangement to operate in synchronism with said electron beam scanning means.

2. An electron microscope according to claim 1 wherein said second stage means is located in the back focal plane of one lens element of said magnification lens means.

3. An electron microscope according to claim 2 wherein said magnification lens means comprises a series of electron lenses arranged in succession along the electron beam path and that the second stage means is located at the back focal plane of the last of said lenses.

4. An electron microscope according to claim 1 wherein the scanning means are located within the lens element providing the back focal plane location for the second stage means.

5. An electron microscope according to claim 1 wherein the second stage means is located in the back focal plane of the final lens element of the magnification lens means and further comprising a stigmator and an aperture stop arranged at a first or objective lens element of said magnification means following the first stage means and a further stigmator and aperture stop are arranged at said final or projector lens element of said magnification means preceding the second stage means.

6. An electron microscope according to claim 1 wherein at least two lens elements of the microscope lens means are disposed in succession between the first and second stage means, first and second aperture stops being repectively disposed at the lens element immediately following the first stage means and at the lens element immediately preceding the second stage means, respective vacuum pumping means being connected to the instrument interior at opposite sides of said second aperture stop, said stop being arranged to act as a partial seal to permit the establishment of a higher vacuum on its upstream side.

7. An electron microscope comprising, in combination, an electron source, electron condenser lens means in the path from said source, first stage means for locating a specimen in said electron path downstream of the condenser lens means, electron magnification lens means in the path from said first stage means specimen location, the additional structure comprising, in combination, a further specimen stage in the back focal plane of one lens element of the microscope lens system, beam deflection means in the electron beam path preceding said further stage, emission collector means associated with said further stage and observation recording means connected to said emission collection means to receive the output therefrom, time base scanning actuation means connected to said recording means and said beam deflection means to operate both in synchronism with each other whereby scanning observations may be made upon a specimen located at said further stage.

8. An electron microscope according to claim 7 wherein said further specimen stage is located in the back focal plane of one of the magnification lenses following the non-scanning specimen stage.

9. An electron microscope according to claim 8 wherein said further specimen stage is located in the back focal plane of the last of the magnification lenses and immediately preceding the image plane for the recordal of non-scanning observations.

10. An electron microscope according to claim 7 wherein said further specimen stage is located in the same section of the microscope as the non-scanning specimen stage located in the back focal plane of the final condenser lens preceding said non-scanning stage.

References Cited

UNITED STATES PATENTS 3,307,066    2/1967    Shapiro et al.
3,374,346    3/1968    Watanabe.

ARCHIE R. BORCHELT, Primary Examiner

S. C. SHEAR, Assistant Examiner